United States Patent [19]

Miyabayashi et al.

[11] Patent Number: 4,977,533
[45] Date of Patent: Dec. 11, 1990

[54] METHOD FOR OPERATING AN FFT PROCESSOR

[75] Inventors: Nobuyoshi Miyabayashi; Masami Hosono, both of Tokyo; Atsushi Abe, Akishima, all of Japan

[73] Assignee: JEOL Ltd., Tokyo, Japan

[21] Appl. No.: 419,088

[22] Filed: Oct. 10, 1989

[51] Int. Cl.$^5$ .................................................. G06F 15/40
[52] U.S. Cl. ..................................................... 364/726
[58] Field of Search ............................. 364/725, 726

[56] References Cited

U.S. PATENT DOCUMENTS

| 4,534,009 | 8/1985 | McGee | 364/726 |
| 4,689,762 | 8/1987 | Thibodeau, Jr. | 364/726 |
| 4,764,974 | 8/1988 | Woods | 364/726 X |
| 4,791,598 | 12/1988 | Liou et al. | 364/725 |
| 4,821,224 | 4/1989 | Liu et al. | 364/726 |
| 4,868,776 | 9/1989 | Gray et al. | 364/726 |

OTHER PUBLICATIONS

"Fast Fourier Transform of Externally Stored Data" of Norman M. Brenner, IEEE Transactions on Audio and Electroacoustics, vol. AU-17, No. 2, pp. 128-132, Jun. 1969.

Primary Examiner—Dale M. Shaw
Assistant Examiner—Tan V. Mai
Attorney, Agent, or Firm—Webb, Burden, Ziesenheim & Webb

[57] ABSTRACT

A method for fast Fourier transforming data in large quantities stored in an external storage at a high speed is disclosed. In the method, data stored in the external storage is supposed that the data consists of data elements of N1 rows and N2 columns. And the data is read out from the external storage along the column direction, transferred to the processor, fast Fourier transformed, and returned to the external storage. Then, the data is read out from the external storage along the row direction, transferred to the processor, fast Fourier transformed, and returned to the external storage. Bit reversal of data elements and transposition are done in the appropriate step of the procedure.

6 Claims, 10 Drawing Sheets

Fig. 1

(PRIOR ART)

Fig. 2
(PRIOR ART)

| 0,1,....N2-1 | N2...2·N2-1 | 2·N2...3·N2-1 | ---------- | (N1-1)·N2...N1·N2-1 |

16 POINTS

Fig. 9a

4 POINTS

Fig. 9b $$\begin{bmatrix} C_0 \\ C_1 \\ C_2 \\ C_3 \end{bmatrix} = \begin{bmatrix} 1 & 1 & 1 & 1 \\ 1 & W_4^1 & W_4^2 & W_4^3 \\ 1 & W_4^2 & W_4^4 & W_4^6 \\ 1 & W_4^3 & W_4^6 & W_4^9 \end{bmatrix} \begin{bmatrix} X_1 \\ X_2 \\ X_3 \\ X_4 \end{bmatrix}$$

$\Downarrow \quad W_4^K \rightarrow W_{16}^K$ $$\begin{bmatrix} 1 & 1 & 1 & 1 \\ 1 & W_{16}^1 & W_{16}^2 & W_{16}^3 \\ 1 & W_{16}^2 & W_{16}^4 & W_{16}^6 \\ 1 & W_{16}^3 & W_{16}^6 & W_{16}^9 \end{bmatrix}$$

$\Downarrow$ BIT REVERSING ON EACH ROW $$\begin{bmatrix} 1 & 1 & 1 & 1 \\ 1 & W_{16}^2 & W_{16}^4 & W_{16}^6 \\ 1 & W_{16}^1 & W_{16}^2 & W_{16}^3 \\ 1 & W_{16}^3 & W_{16}^6 & W_{16}^9 \end{bmatrix}$$

$\Downarrow$ VECTORIZATION $(1, \ 1, \ 1, \ 1, \ 1, \ W_{16}^2, W_{16}^4, W_{16}^6, 1, \ W_{16}^1, W_{16}^2, W_{16}^3, 1, \ W_{16}^3, W_{16}^6, W_{16}^9)$

METHOD FOR OPERATING AN FFT PROCESSOR

FIELD OF THE INVENTION

The present invention relates to a method operating an FFT processor in communication with an external storage device for fast Fourier transforming data in large quantities at a high speed.

BACKGROUND OF THE INVENTION

When data is fast Fourier transformed using a computer, complex coefficients, known as twiddle factors, are used. A twiddle factor is given by $$W_n^k = \cos(2\pi/n)k - \sin(2\pi/n)k$$

Figure 1:
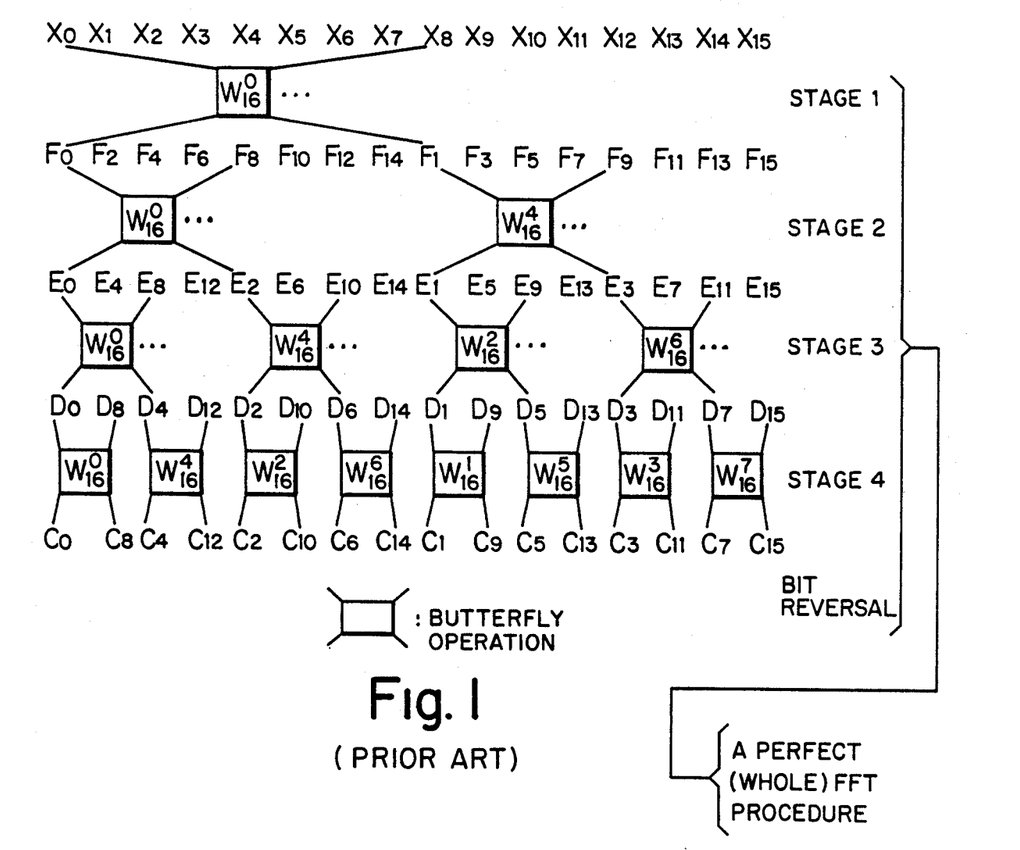
FIG. 1 is a diagram illustrating an algorithm by which FFT operations are performed to handle 16 data elements.

That is, it is composed of the real part of a cosine function and the imaginary part of a sine function. In the above equation, n is the number of data elements to be fast Fourier transformed, $k=0, \ldots, n-1$. FIG. 1 illustrates the algorithm of an FFT performed on 16 points. A butterfly operation is a unit operation of an FFT. The butterfly operation is conducted from left to right in stage 1 of FIG. 1. Then, stages 2 and 3 are handled. Correspondingly, the twiddle factor is quoted in the same order.

An FFT hardware processor may not handle whole data to be Fourier transformed in one FFT processing. In this context, Fourier transform processing involves a fast Fourier transform and transposition of data, or bit reversal. One reason why whole data cannot be Fourier transformed in one FFT processing is that the data cannot be placed into the memory of the processor simultaneously.

In order to take the Fourier transform of such a large quantity of data, it is necessary to provide access to the data in a complicated manner.

Figure 2:
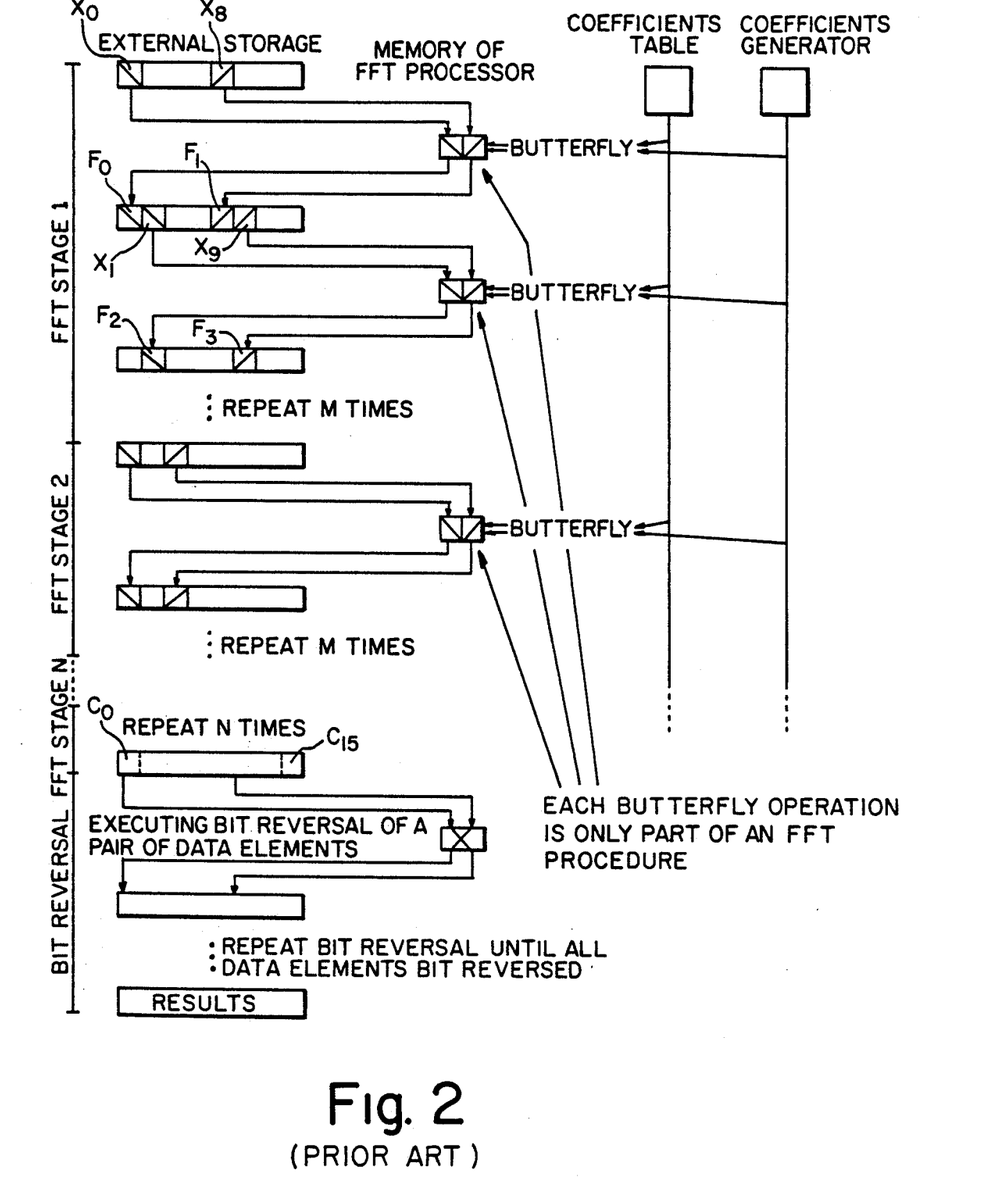
FIG. 2 is a diagram illustrating the usage of a memory and the processing in the prior art Fourier transform handling data in large quantities.

FIG. 2 shows the conventional method by which a memory is used to take the Fourier transform of data in large quantities. FIG. 2 also shows the processing. Data exists outside an FFT hardware processor. Where the processor is a host computer, data is stored in an external storage such as a magnetic disk. Where the processor is different from the host computer, data is stored in the memory of the host computer or in an external storage such as a magnetic disk.

If the capacity of the memory of the FFT processor is small, it cannot implement an FFT in one operation. In this case, the processor fetches as much data as possible to the memory as shown in FIG. 2 and performs butterfly operations on the data. The FFT implementation is divided into N ($=\log_2 n$) stages. When each stage is separated into M parts, M times of transfers (fetch and store) of data and M times of butterfly operations must be executed.

When the processing is complex as shown in FIG. 2, fast Fourier transform (FFT) cannot be implemented at a high speed. Furthermore, the twiddle factor table must be extended up to a requisite size. Hence, the cost performance deteriorates.

In the case of FIG. 2, the data is transferred from the external storage to the processor and returned to the external storage from the processor, at each stage. Therefore, the total number of data transferred during the whole FFT implementation is given by 2 × total amount of data × N stages For this reason, a reduction in the speed cannot be avoided even if double buffering techniques are exploited.

Where data exists in a host computer, bit reversal may be done by the computer and so little problems take place. However, where data exists on an external storage such as a magnetic disk, the speed is reduced considerably for the following reason. Two data elements to be interchanged are placed on a position (x) and on a bit reversal position of the position (x), therefore, some data element pairs cannot be exchanged at a time. That is, one data element must be moved when one transfer instruction is issued. This reduces the transfer speed down to a minimum, where a minimum amount of data, e.g., Y data elements, must be transferred from an external storage such as magnetic disk, a wasteful transfer given by $(Y-1) \times 4$ takes place to interchange the elements of one pair. Since this transfer is conducted for all the data, all the wasteful transfer is given by $$(Y-1) \times 4 \times (n/2)$$

In this way, wasteful transfer slows down the processing.

As described above, the method illustrated in FIG. 2 enables Fourier transform of data in large quantities, but the processing speed is quite low.

Other conventional methods for FFT of data in large quantities are described in an article entitled "Fast Fourier Transform of Externally Stored Data" by Norman M. Brenner in *IEEE Transactions on Audio and Electroacoustics*, Vol. AU-17, No. 2, pp. 128–132, June 1969.

In the article, two methods for fast Fourier transform of data in large quantities, named Ryder's method and Granger's method, are disclosed. Both methods have the following problems regarding processing speed.

Ryder's method contains twice reading accesses from the external storage and twice writing accesses to the external storage. When data to be fast Fourier transformed is supposed to consist of data elements of C1 rows and C2 columns, the number of data transferred during whole FFT implementation is estimated as follows:

| $nC1$ | + $n$ | + $n$ | + $n$ | = $(3 + C1)n$ |
|---|---|---|---|---|
| 1st read | 1st write | 2nd read | 2nd write | |

Ordinarily, since $C1 \gg 1$, the number of data read from the external storage in the first reading access is quite large. Therefore, the number of data transferred during whole FFT implementation is quite large. Then, it cannot be avoided to lower the processing speed.

On the other hand, Granger's method contains five times of reading accesses from the external storage and five times of writing accesses to the external storage. In the method, the number of data transferred during whole FFT implementation is estimated to $10 \times n$. It can be understood that 10 times of reading/writing accesses cause to lower the processing speed.

SUMMARY OF THE INVENTION

Accordingly, it is an object of the present invention to provide a process of operating a FFT hardware processor in communication with an external data storage device for fast Fourier transform of data in large quantities stored in said external storage device at a high speed.

According to the present invention, data stored in the external storage is considered to consist of data elements organized in N1 rows and N2 columns such that the data in external storage may be considered to consist of data elements organized in rows and columns defined by index bits. The data is read out from the external storage device along the column or row direction, transferred to the FFT processor, fast Fourier transformed, and returned to the external storage. Then, the data is again read out from the external storage along the row or column direction, transferred to the processor, fast Fourier transformed, and returned to the external storage. Index bit reversal of data elements and transposition are performed in the appropriate step(s) of the procedure.

According to a preferred method, the data read from the external storage device along the column direction is transferred to the processor. It is fast Fourier transformed by the processor. Index bits of data elements are reversed in the processor. The data is returned to the external storage. Next, the data is read from the external storage device along the row direction and transferred to the processor. It is multiplied by compensating coefficients and fast Fourier transformed by the processor. Index bits of data elements are reversed in the processor. The data is returned to the external storage. Finally, the data stored in the external storage is transposed.

In a further preferred method, only part of the data is transferred to the FFT processor at one time. The steps following transfer of data are the same and are repeated until all the data stored in the external storage is transformed and returned.

DETAILED DESCRIPTION OF THE INVENTION

The present invention is applied to a combination of any type of FFT hardware processor, e.g., a general-purpose computer, array processor, or the like, and an associated external storage device such as a magnetic disk or the memory of a host computer. The present invention is intended to reduce the total number of data transfers to a minimum for preventing wasteful transfer of data. To realize this, data elements arranged in a line are considered rearranged in rows and columns and then the data is so treated. This method is referred to as the two-dimensional expansion method herein.

Figure 3:
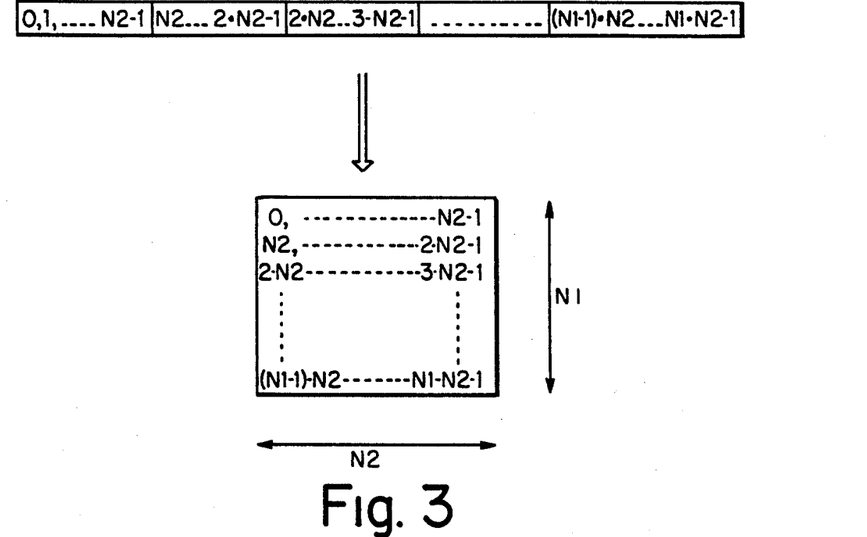
FIG. 3 is a diagram illustrating an algorithm by which data is expanded in two dimensions.

Referring to FIG. 3, one-dimensional data consisting of n data elements arranged in a line is stored in an external storage. We now assume that a processor is available by which up to m (n>m) data elements can be Fourier transformed. As shown in FIG. 3, the n data elements are interpreted as consisting of N1 rows and N2 columns, i.e., n=N1×N2, where N1≦m and N2≦m. Note that this is merely an interpretation. Therefore, the actual addresses at which the data elements exist on the external storage need not be modified.

On this assumption, data is fast Fourier transformed. The number of stages of the butterfly operations is given by $$\log_2 n = \log_2 N1 + \log_2 N2$$

Intrinsically, all the stages equal to $\log_2 n$ should be fast Fourier transformed in one FFT processing. However, the present invention is characterized in that all the stages to be fast Fourier transformed in one FFT processing are divided into stages equal to $\log_2 N1$ and stages equal to $\log_2 N2$. They are referred to as the first step FFT implementation and the second step FFT implementation, respectively.

Figure 4:
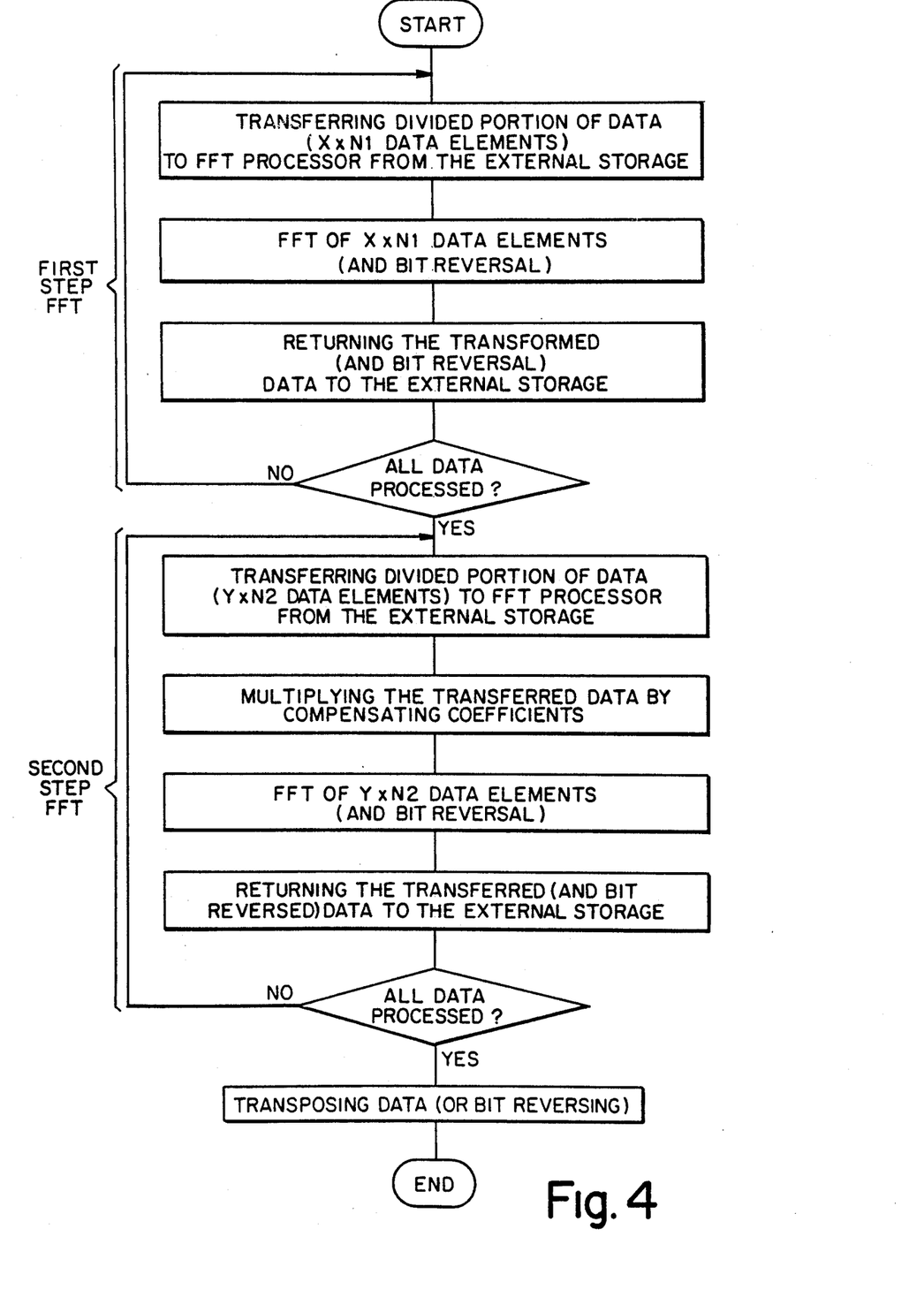
FIG. 4 is a flowchart illustrating an FFT method of handling data in large quantities.

The flow of the FFT implementation is illustrated in FIG. 4. The flow is divided into three processing stages. The first processing stage is the first step FFT implementation. The second processing stage comprises compensation of data and the second step FFT implementation. The third processing stage is to transpose the data expanded in two dimensions, for accomplishing the index bit reversal of the data.

In the process illustrated in FIG. 4, N1 data elements for the first step are fast Fourier transformed, and their bits are reversed. N2 data elements for the second step are fast Fourier transformed, and they are bit reversed. Finally, data expanded in two dimensions is transposed to accomplish the bit reversal of the data.

For bit reversal of all the data elements, the following two modifications are available.

(1) The data about the first step is fast Fourier transformed without bit reversal. The data is fast Fourier transformed in the second step without bit reversal. Then, the data is bit reversed longitudinally and transversely. The data expanded in two dimensions is transposed.

(2) Where the memory of a host computer is used as an external storage, no bit reversal is executed at the time of FFT implementation. Finally, the bit reversal of the data is executed by the host computer.

Figure 5:
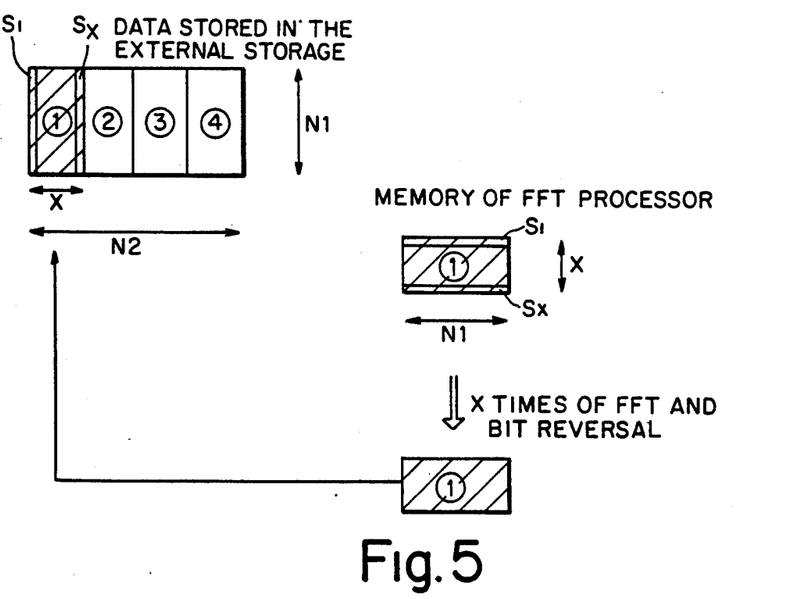
FIG. 5 is a conceptual view illustrating the use of a memory and the transfer of data in the first step of an FFT method according to the invention.

FIG. 5 conceptually illustrates the usage of the memory and the transfer of data in the first step FFT implementation.

In the first step FFT implementation, data is subjected to cycle (=N2/x) division as indicated by the hatching in FIG. 5. Each divided portion is treated as follows. A set of data S1 of the first column consisting of N1 data elements and stored in an external storage is transferred to the memory of the FFT processor. The remaining sets of data (S2, S3, ... Sx) are subsequently transferred in turn. Thus, one divided portion is placed into the memory of the FFT processor. If the plural sets of data spaced from each other by N2 data elements in the external storage are made continuous with each other in the memory, then FFT of the divided portion can be easily implemented. After FFT, x bit reversals are executed for each N1 data elements in the FFT processor are reversed. This bit reversal is carried out in the same memory of the FFT processor. The divided portion of the data which has been fast Fourier transformed and bit reversed is returned to its original position or to a location corresponding to another data region in the external storage. The above-described procedure is repeated N2/x times until the whole divided portions are fast Fourier transformed and bit reversed.

Figure 6:
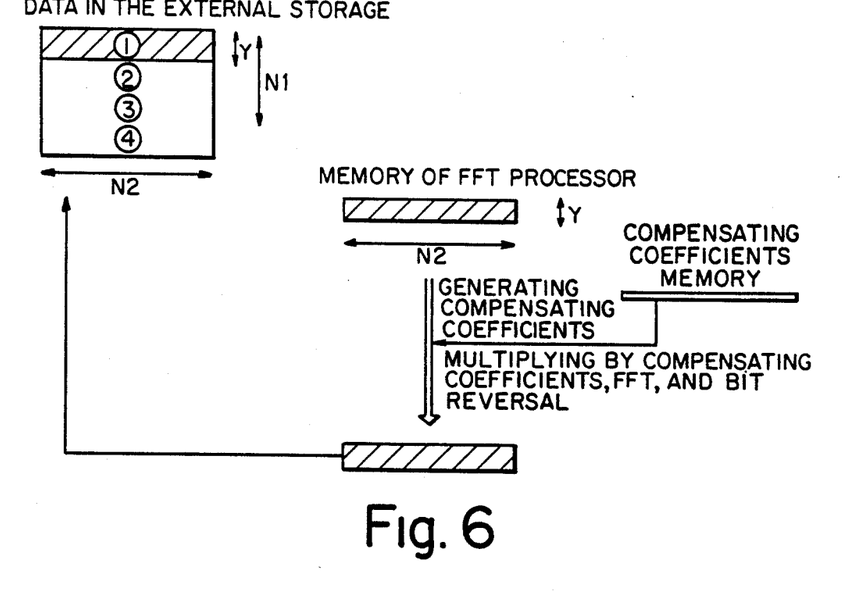
FIG. 6 is a conceptual view illustrating the use of a memory and the transfer of data in the second step of an FFT method according to the invention.
Figure 7:
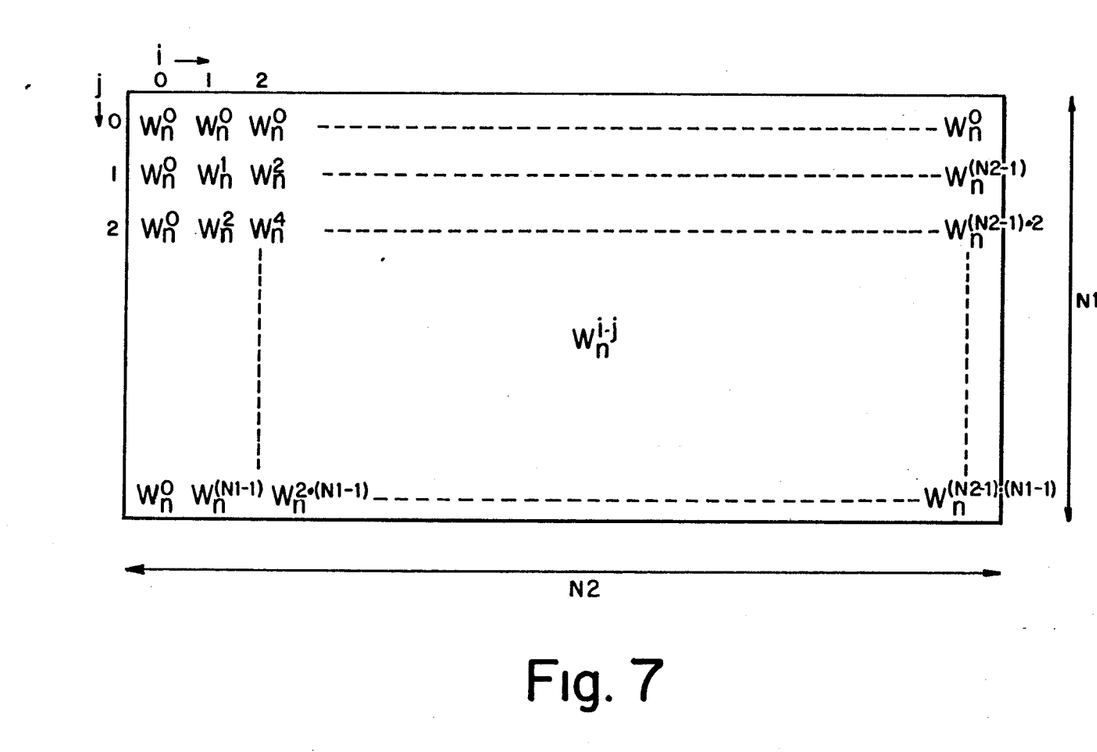
FIG. 7 is a diagram illustrating the correspondence between compensating coefficients and data elements.

FIG. 6 conceptually illustrates the usage of a memory and the transfer of data in the second step FFT implementation. FIG. 7 shows the correspondence between compensating factors and data elements.

In the second step FFT implementation, data stored in the external storage after the first step FFT is subjected to cycle (=N1/y) division as indicated by the hatching in FIG. 6. Each divided portion is treated in the manner described below. First divided portion consisting of a succession of data, i.e., y by N2 data elements is transferred into the memory of the FFT processor from the external storage. Y requisite compensating coefficients are created for every set of N2 data elements and stored in the coefficient memory. Then, the respective N2 data elements constituting the first divided portion are multiplied by the corresponding coefficients and fast Fourier transformed. The bit reversal of the transformed data of the divided portion is executed. The fully processed data of the divided portion is returned to its original positions in the external storage or to locations corresponding to a different data region.

FIG. 7 shows by what compensating coefficients are data elements multiplied prior to the second step FFT implementation. The compensating coefficients are used for the data which has been bit reversed in the first step. If the bit reversal is not executed in the first step, the order is different. One compensating coefficient is needed for each one data element. The compensating coefficients shown in FIG. 7 do not exist at all times, but they are created as the need arises as described already. In FIG. 7, $W_n{}^{i,j}$ means $$W_n{}^i \cdot j = \cos \frac{2\pi \cdot i \cdot j}{n} - i \sin \frac{2\pi \cdot i \cdot j}{n}$$

In the case of inverse Fourier transform, $W_n{}^{i,j}$ takes the conjugate complex number.

Figure 8:
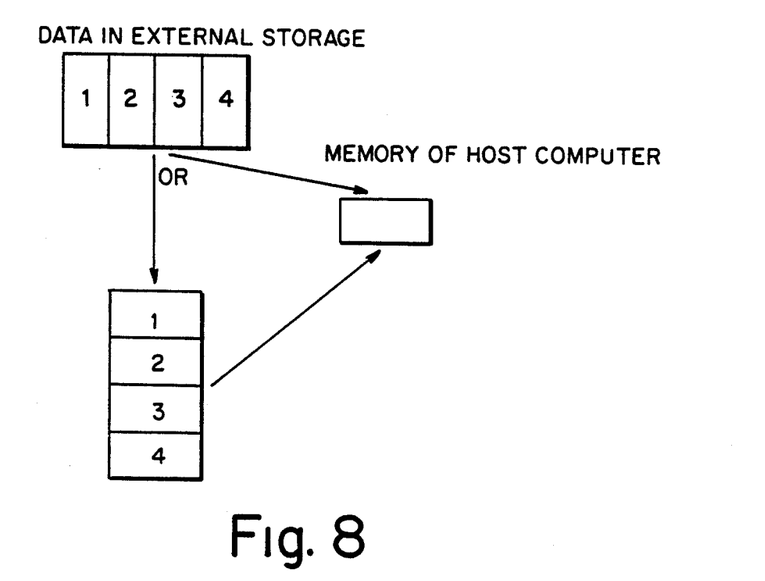
FIG. 8 is a diagram illustrating the manner in which data is moved when data expanded in two dimensions is transposed.

FIG. 8 shows the manner in which data is shifted when data expanded in two dimensions is transposed. When N2=N1, data can be transposed inside the same data region. When N2≠N1, data cannot be transposed quickly unless data is moved into a different data region.

Where the external storage for the FFT processor is a magnetic disk or the like, data is once transferred into the memory of the host computer which plays key roles in the processing and then the data is returned to the external storage. At this time, the data expanded in two dimensions can be transposed, making use of the memory of the computer. If the data cannot fully enter the host computer, the data is divided into plural portions and they are separately handled, in the same way as in the first and second steps of FFT implementation. If the external storage is the memory of the host computer, data may be transposed within the memory.

Data has been interpreted as being expanded in two dimensions. Here the data is reinterpreted as one-dimensional data. Thus, the fast Fourier transform of data in large quantities is completed. Obviously, it is not necessary to modify the addresses of the data.

We next discuss the case in which 16 data elements are fast Fourier transformed, using a processor capable of fast Fourier transforming only 4 data elements.

Figure 9A:
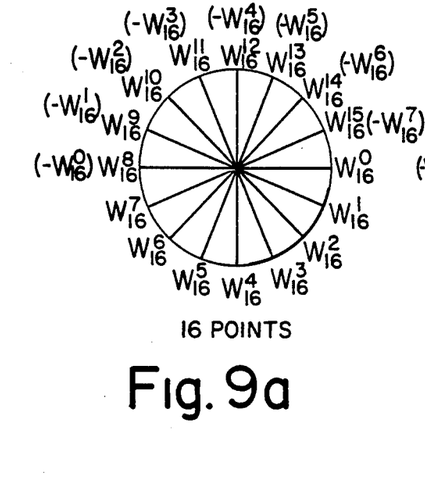
FIGS. 9a–b show the relation between the arrangement of 16 twiddle factors and the arrangement of 4 rotation factors.
Figure 9B:
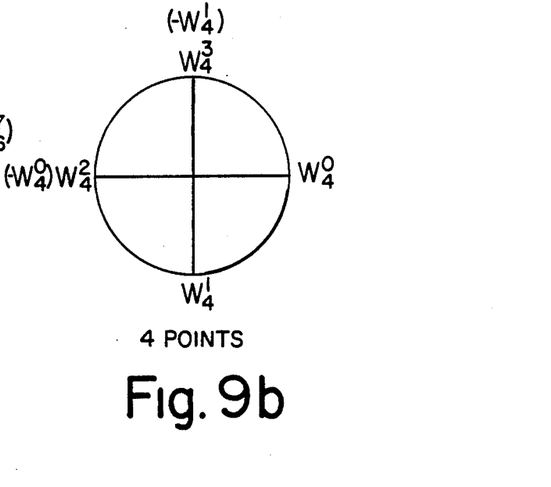
Figure 10:
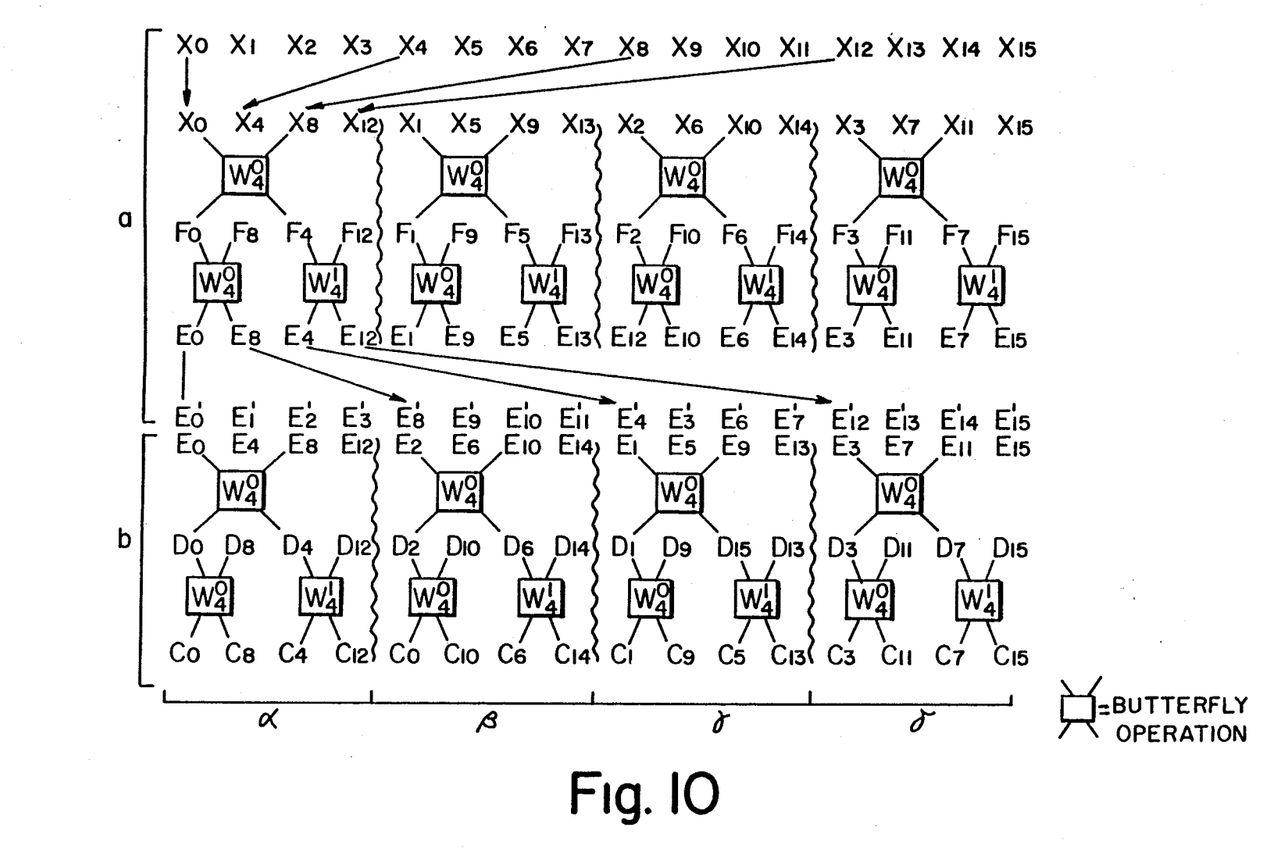
FIG. 10 is a diagram illustrating an algorithm by which butterfly operations are performed to handle 16 data elements as 4×4 data elements, i.e., in two dimensions.
Figure 11:
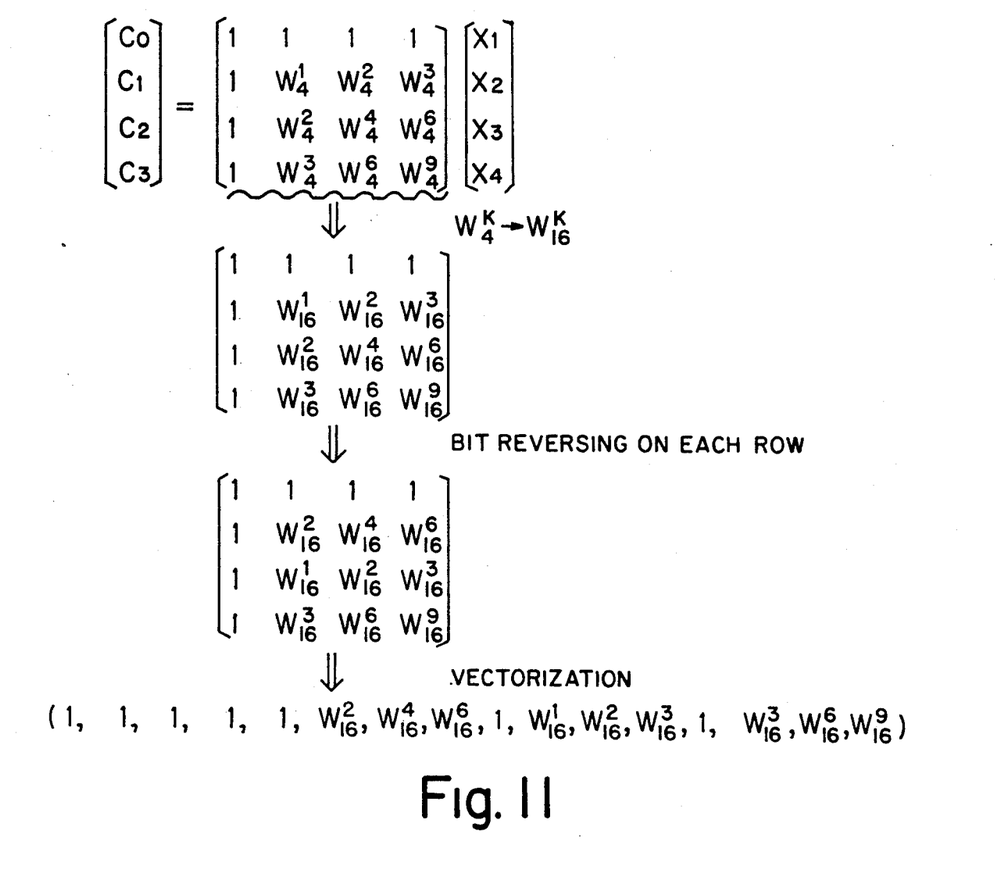
FIG. 11 is a diagram illustrating the manner in which vectors are created.

FIG. 9 shows the relation between the arrangement of 16 twiddle factors and the arrangement of 4 twiddle factors. FIG. 10 is a diagram illustrating the algorithm by which data elements are treated as 4×4 data elements, i.e., as two-dimensional data, in butterfly operations. FIG. 11 is a diagram illustrating how to create compensating coefficients vector. The algorithm permitting 16 data elements to be fast Fourier transformed by the use of an FFT processor capable of fast Fourier transforming only 4 data elements depends much on how efficiently is FFT reduced to discrete Fourier transform (DFT). In principle, 16 data elements are treated as two-dimensional data composed of x×y=16. Fast Fourier transform of 4 data elements is implemented in the x-direction and in the y-direction separately. The obtained data is coupled by DFT to implement Fourier transform of 16 data elements.

We now notice the relation between the 16 twiddle factors $W_N{}^k$ and the 4 twiddle factors $W_N{}^k$. As can be seen from FIG. 9, $$W_{16}{}^0 = W_4{}^0$$

$$W_{16}{}^4 = W_4{}^1$$

$$W_{16}{}^8 = W_4{}^2$$

$$W_{16}{}^{12} = W_4{}^3$$

The butterfly operation in which 16 data elements are treated as 4×4 two-dimensional data elements, is illustrated in FIG. 10. Comparing the butterfly operation on the 16 data elements as shown in FIG. 10 with the butterfly operation shown in FIG. 1 reveals that the results E's of the calculations in the portion a (FFT in the y-direction) are exactly the same, since $W_{16}{}^4 = W_4{}^1$ is held. Therefore, we should take notice of portion b and can determine the compensating coefficients vector R of DFT acting on the E's.

Noting a of portion b, we resolve the butterfly. From the 16 data elements, we have $$C_0 = E_0 + E_4 W_{16}^0 + E_8 W_{16}^0 + E_{12} W_{16}^0 W_{16}^0 \quad (1)$$

$$C_8 = E_0 - E_4 W_{16}^0 + E_8 W_{16}^0 - E_{12} W_{16}^0 W_{16}^0$$

$$C_4 = E_0 + E_4 W_{16}^4 - E_8 W_{16}^0 - E_{12} W_{16}^0 W_{16}^4$$

-continued
$$C_{12} = E_0 + E_4 W_{16}^4 - E_8 W_{16}^0 + E_{12} W_{16}^0 W_{16}^4$$

From 4×4 data elements, we get $$C_0 = E_0 + E_4 W_4^0 + E_8 W_4^0 + E_{12} W_4^0 W_4^0 \quad (1)'$$

$$C_8 = E_0 + E_4 W_4^0 - E_8 W_4^0 - E_{12} W_4^0 W_4^0$$

$$C_4 = E_0 + E_4 W_4^1 - E_8 W_4^0 - E_{12} W_4^0 W_4^1$$

$$C_{12} = E_0 - E_4 W_4^0 - E_8 W_4^0 + E_{12} W_4^0 W_4^1$$

Comparing equations (1) with equations (1)' while considering the relation between $W_{16}^k$ and $W_4^k$, we see that they are exactly the same. Therefore, we have the following relationships:

$$E_0 = E_0', \quad E_4 = E_1'$$

$$E_8 = E_2', \quad E_{12} = E_3'$$

Noting $\beta$ of portion b, we resolve the butterflies. From the 16 data elements, we have $$C_2 = E_2 + E_6 W_{16}^2 + E_{10} W_{16}^4 + E_{14} W_{16}^4 W_{16}^2 \quad (2)$$

$$C_{10} = E_2 - E_6 W_{16}^2 + E_{10} W_{16}^4 - E_{14} W_{16}^4 W_{16}^2$$

$$C_6 = E_2 + E_6 W_{16}^6 - E_{10} W_{16}^4 - E_{14} W_{16}^4 W_{16}^6$$

$$C_{14} = E_2 - E_6 W_{16}^6 - E_{10} W_{16}^4 + E_{14} W_{16}^4 W_{16}^6$$

From 4×4 data elements, we have $$C_2 = E_2 + E_6 W_4^0 + E_{10} W_4^0 + E_{14} W_4^0 W_4^0 \quad (2)'$$

$$C_{10} = E_2 - E_6 W_4^0 + E_{10} W_4^0 - E_{14} W_4^0 W_4^0$$

$$C_6 = E_2 + E_6 W_4^1 - E_{10} W_4^0 + E_{14} W_4^0 W_4^1$$

$$C_{14} = E_2 - E_6 W_4^1 - E_{10} W_4^0 + E_{14} W_4^0 W_4^1$$

We compare equations (2) with equations (2)', considering the relation between $W_{16}^k$ and $W_4^k$. In order that the results of equations (2) be equal to the results of equations (2)', the following relations must hold:

$$E_2 = E_8$$

$$E_6 = E_9' \cdot W_{16}^2$$

$$E_{10} = E_{10}' \cdot W_{16}^4$$

$$E_{14} = E_{11}' \cdot W_{16}^6$$

Similarly, we respect to $\gamma$ and $\delta$ of portion b, the following relations must be satisfied:

$$E_1 = E_4'$$

$$E_5 = E_5' \cdot W_{16}^1$$

$$E_9 = E_6' \cdot W_{16}^2$$

$$E_{13} = E_7' \cdot W_{16}^3$$

$$E_3 = E_{12}'$$

$$E_7 = E_{13}' \cdot W_{16}^3$$

$$E_{11} = E_{14}' \cdot W_{16}^6$$

-continued
$$E_{15} = E_{15}' \cdot W_{16}^9$$

In this way, the vector R is given by (1, 1, 1, 1, 1, $W_{16}^2$, $W_{16}^4$, $W_{16}^6$, 1, $W_{16}^1$, $W_{16}^2$, $W_{16}^3$, 1, $W_{16}^3$, $W_{16}^6$, $W_{16}^9$).

This vector is obtained by replacing $W_4^k$ of the matrix of the twiddle factors acting during DFT of four data elements with $W_{16}^k$, causing the bit reversal of 4 (2 bits) to act on the row of the matrix shown in FIG. 11. The use of this method enables a large amount of data to be Fourier transformed.

Figure 12A:
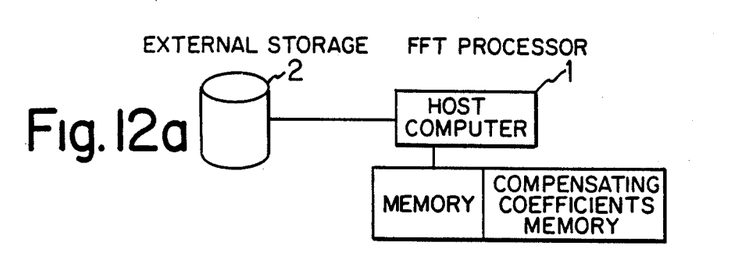
FIGS. 12a–c are diagrams of an FFT hardware system handling data in large quantities, the system being built in accordance with the invention.
Figure 12B:
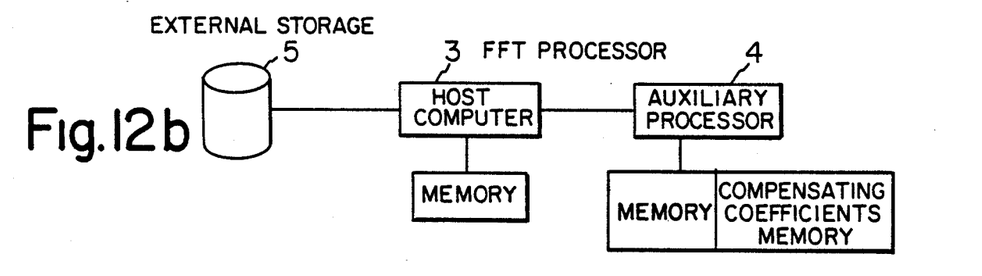
Figure 12C:
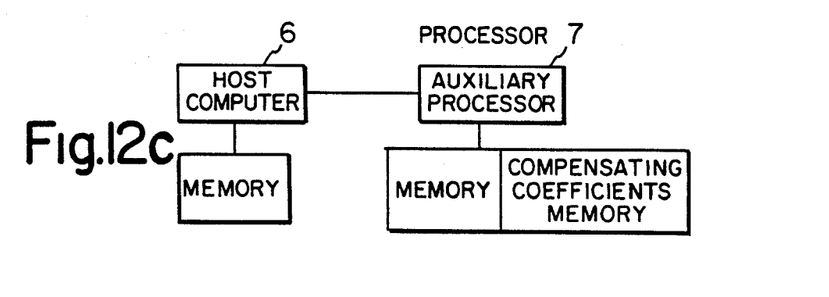

FIG. 12 shows examples of the fast Fourier transform hardware system according to the invention. FIG. 12(a) shows an example in which an FFT processor 1 is combined with an external storage 2 storing data. FIG. 12(b) shows an example in which a host computer 3 and an auxiliary processor 4 together form an FFT processor. This processor is combined with an external storage 5 in which data is stored. FIG. 12(c) shows an example in which data is stored in the memory of a host computer 6 and in an external storage. An auxiliary processor 7 other than the host computer 6 is employed as an FFT processor.

As can be seen from the description made thus far, in accordance with the present invention, the amount of transferred data including the amount of data transferred for FFT and bit reversal is given by total number of data transferred = 2 × total amount of data × 3. Therefore, the total number of data transferred is much smaller than that of the prior art method described in connection with FIG. 2. Hence, the processing can be carried out at a high speed. If double buffering techniques are employed in the processing, the effect of this processing method can be enhanced further. Additionally, slowdown of Fourier transform of data in large quantities can be prevented even if the capacity of the FFT hardware processor is insufficient. Since a large amount of data can be Fourier transformed at a high speed without adding any memory to the FFT processor, the system is excellent in cost performance.

Having thus described our invention with the detail and particularity required by the Patent Laws, what is claimed and desired to be protected by Letters Patent is set forth in the following claims.

What is claimed is:

1. A process of operating an FFT hardware processor in communication with an external data storage device for fast Fourier transforming data in large quantities stored in an external storage comprising the steps of:
    (a) organizing the data held in said external storage to consist of data elements indexed by N1 rows and N2 columns, such that each data element is retrieved by index bits corresponding to said row and column;
    (b) retrieving the data elements from the external storage along the column direction and transferring the said data elements to the processor;
    (c) fast Fourier transforming the data elements by the processor to produce once transformed data elements;
    (d) reversing the index bits corresponding to each once transformed data element in the processor;
    (e) returning the bit-reversed once transformed data elements to the external storage such that the data transferred to external storage is organized to consist of data elements indexed by rows and columns defined by the index bits;

(f) retrieving the bit-reversed once transformed data elements from the external storage along the row direction and transferring the said data elements to the processor;

(g) multiplying the bit-reversed once transformed data elements by compensating coefficients;

(h) fast Fourier transforming data elements comprising the product of the bit-reversed once transformed data elements and the compensating coefficients by the processor to produce twice transformed data elements;

(i) reversing the index bits corresponding to each twice transformed data element in the processor;

(j) returning the data comprising bit-reversed twice transformed data element to the external storage such that the data transferred to external storage consists of data elements organized in rows and columns indexed by the index bits; and (k) transposing the bit-reversed twice transformed data elements stored in the external storage.

2. The process of operating an FFT hardware processor in communication with an external data storage device according to claim 1, wherein only part of the data elements stored in external storage are transferred in step (b) and only part of the bit-reversed once transformed data elements stored in external storage are transferred in step (f), and wherein the sequence comprising the steps (b) to (e) and the sequence comprising the steps (f) to (j) are repeated respectively, until all the data elements stored in the external storage have been twice transformed bit-reversed and returned.

3. A process for operating an FFT hardware processor in communication with an external data storage device for fast Fourier transforming data in large quantities stored in an external storage comprising the steps of:

(a) organizing the data held in said external storage to consist of data elements indexed by N1 rows and N2 columns such that each data element is retrieved by index bits corresponding to said row and column;

(b) retrieving the data elements from the external storage along the column direction and transferring the said data elements to the processor;

(c) fast Fourier transforming the data elements by the processor to produce once transformed data elements;

(d) returning the once transformed data elements to the external storage;

(e) retrieving the once transformed data elements from the external storage along the row direction and transferring the said retrieved data elements to the processor;

(f) multiplying the once transformed data elements by compensating coefficients and fast Fourier transforming data elements comprising product of the once transformed data elements and the compensating coefficients by the processor to produce twice transformed data elements;

(g) returning the twice transformed data elements to the external storage; and (h) reversing the index bits corresponding to each twice transformed data element in the external storage.

4. The process of operating an FFT hardware processor in communication with an external data storage device according to claim 3, wherein only part of the data elements stored in external storage are transferred in step (b) and only part of the once transformed data elements stored in external storage are transferred in step (e), and wherein the sequence comprising the steps (b) to (d) and the sequence comprising the steps (e) to (g) are repeated respectively, until all the data elements stored in the external storage have been twice transformed and returned.

5. The process of operating an FFT hardware processor in communication with an external data storage device according to claim 3 or 4, wherein the step (h) is carried out in the external storage.

6. The process of operating an FFT hardware processor in communication with an external data storage device according to claim 3 or 4, wherein the step (h) comprises the steps of:

(i) retrieving the twice transformed data elements from the external storage along the column or row direction, transferring the retrieved twice transformed data elements to the processor, reversing the index bits corresponding to each twice transformed data element, and returning the bit-reversed twice transformed data elements to the external storage;

(j) retrieving the bit-reversed twice transformed data elements from the external storage along the row or column direction, transferring the retrieved bit-reversed twice transformed data elements to the processor, reversing the index bits corresponding to each data element, and returning the twice bit-reversed twice transformed data elements to the external storage; and (k) transposing the twice bit-reversed twice transformed data elements stored in the external storage.

* * * * *

UNITED STATES PATENT AND TRADEMARK OFFICE
CERTIFICATE OF CORRECTION

PATENT NO. : 4,977,533
DATED : December 11, 1990
INVENTOR(S) : Nobuyoshi Miyabayashi, Masami Hosono and Atsushi Abe It is certified that error appears in the above-identified patent and that said Letters Patent is hereby corrected as shown below:

ON TITLE PAGE after the filing information insert
--Foreign Application Priority Data
October 11, 1988 [JP] Japan ... 63-255461--.

Column 1 Line 15 "k - sin" should read --k - i sin--.

Column 3 Line 50 ":" should read --;--.

Column 5 Line 57 "ij" should read --i · j--.

Column 5 Line 58 "$W_n^i \cdot j$" should read --$W_n^{i \cdot j}$--.

Column 5 Line 62 "ij" should read --$^{i \cdot j}$--.

Column 7 Line 2 "$E_0 + E_4 W_{16}^4$" should read --$E_0 - E_4 W_{16}^4$--.

Column 7 Line 11 "$E_4 W_4^0$" should read --$E_4 W_4^1$--.

Column 7 Line 38 "$E_{10} W_4^0 +$" should read --$E_{10} W_4^0 -$--.

Claim 1 (j) Line 17 Column 9 "element" should read --elements--.

Signed and Sealed this

Fourth Day of August, 1992

Attest:

DOUGLAS B. COMER

*Attesting Officer*          *Acting Commissioner of Patents and Trademarks*